(12) United States Patent
Al-Otaibi

(10) Patent No.: US 9,739,651 B1
(45) Date of Patent: Aug. 22, 2017

(54) VARIABLE CONE FLOW METER

(71) Applicant: Saudi Arabian Oil Company, Dharan (SA)

(72) Inventor: Abdullah M. Al-Otaibi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/161,482

(22) Filed: May 23, 2016

(51) Int. Cl.
*G01F 1/34* (2006.01)
*G01F 1/36* (2006.01)
*G01F 15/14* (2006.01)

(52) U.S. Cl.
CPC ............... *G01F 1/36* (2013.01); *G01F 15/14* (2013.01)

(58) Field of Classification Search
CPC ..... G01F 1/34; G01F 1/37; G01F 1/44; G01F 1/40
USPC ............... 73/861.52, 861.42, 861.55, 861.63
See application file for complete search history.

(56) References Cited

U.S. PATENT DOCUMENTS

| | | | |
|---|---|---|---|
| 5,445,035 A | 8/1995 | Delajoud | |
| 5,814,738 A * | 9/1998 | Pinkerton | G01F 1/3218 73/861.22 |
| 7,047,822 B2 | 5/2006 | Good et al. | |
| 7,293,471 B2 | 11/2007 | Lund Bo et al. | |
| 7,481,118 B2 | 1/2009 | Nyfors | |
| 7,500,405 B2 * | 3/2009 | Gongaware | G01F 1/40 73/861.52 |
| 7,770,469 B2 | 8/2010 | Nyfors et al. | |
| 7,832,283 B2 * | 11/2010 | Peters | G01F 1/40 73/861.52 |
| 8,056,409 B2 | 11/2011 | Steven | |
| 8,820,178 B2 * | 9/2014 | Ayers | G01F 1/36 73/861.42 |
| 8,966,994 B2 | 3/2015 | Gentile et al. | |
| 9,068,867 B2 | 6/2015 | Ayers et al. | |

* cited by examiner

*Primary Examiner* — Jewel V Thompson
(74) *Attorney, Agent, or Firm* — Bracewell LLP; Constance G. Rhebergen; Keith R. Derrington

(57) ABSTRACT

A flow meter for measuring fluid flow in a tubular that includes an obstruction suspended in a path of the fluid flow, and where the obstruction has a conical shape. The obstruction can be conically shaped on its upstream and downstream ends, or can be conically shaped only on its upstream end. When only the upstream end is conically shaped, the downstream end can be substantially planar or shaped like a hemisphere. Optionally, the aspect ratio of the obstruction can be changed by manipulating supports that suspend the obstruction within the flow meter.

20 Claims, 3 Drawing Sheets

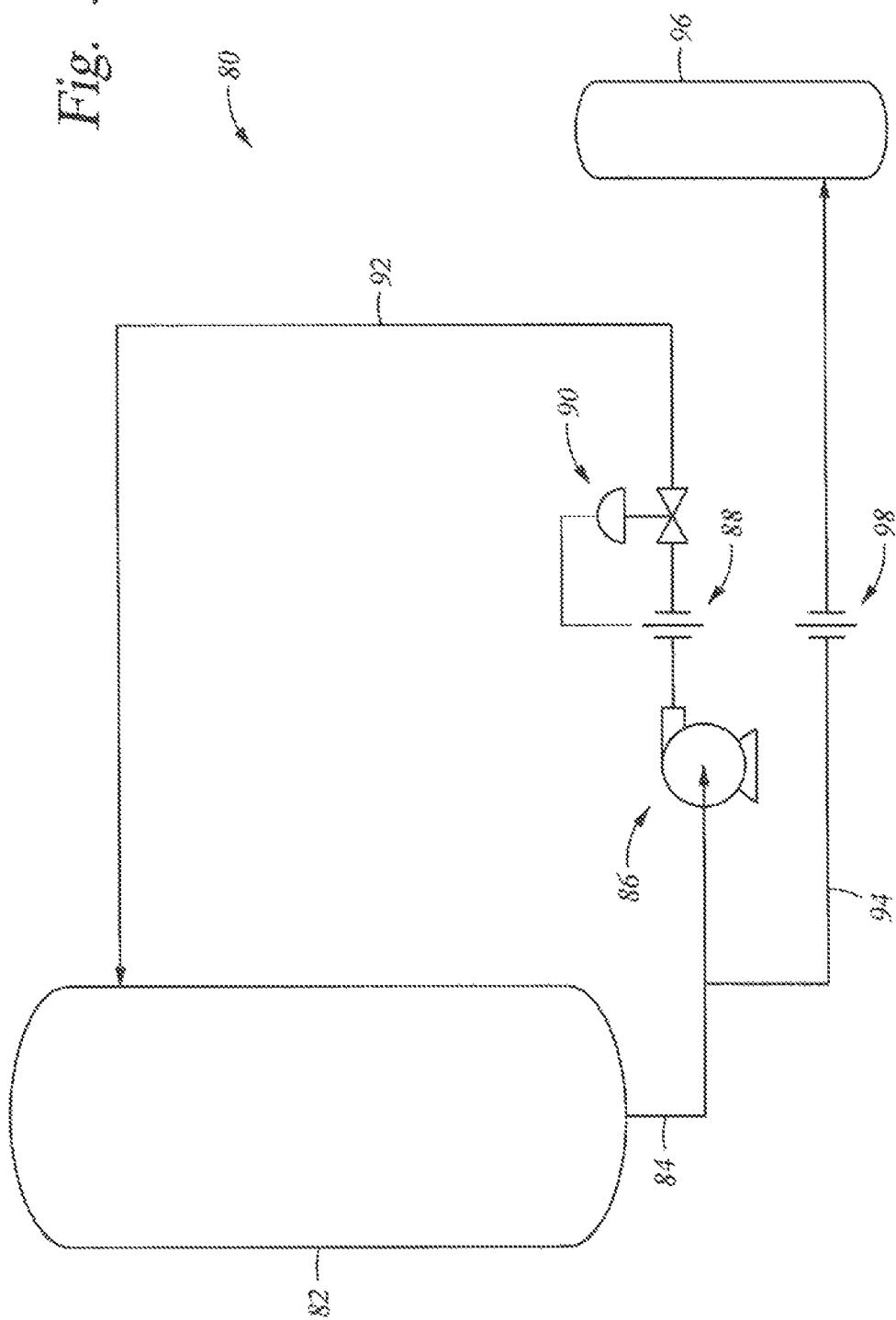

VARIABLE CONE FLOW METER

BACKGROUND OF THE INVENTION

1. Field of Invention

The present disclosure relates to a flow meter having a cone shaped flow element. The present disclosure also relates to a flow meter having a flow element with dimensions that are selectively changeable.

2. Description of Prior Art

Facilities that handle fluids, such as refineries, chemical processing plants, terminals for loading and offloading fluids, transmission pipelines, and the like, typically employ flow meters within flow lines for measuring fluid flowrates through the flow lines. While some flow meters monitor flow external to a flow line, most flow meters have components within the flow line that interact with the fluid to obtain a measure of the flowrate. Some flow meters include rotating, elements, such as spinners or propellers that rotate in response to the fluid flowing past the flow meter. These flow meters monitor the rotational velocity of the rotating element and correlate it to the fluid velocity.

Other types of flow meters introduce a temporary restriction in the cross sectional area of the fluid stream and monitor a pressure differential created by flowing the fluid across the restriction. One type of restriction is an orifice plate, which as the name implies, is a plate set transverse to the flow with an orifice through axially formed through its mid portion. Another restrictive flow meter incorporates a Venturi tube with a reduced diameter throat through which the fluid flow being monitored is directed. Additional examples of flow meters restrict the cross sectional area of flow by suspending an obstruction in the path of the fluid flowing through the flow meter.

SUMMARY OF THE INVENTION

Disclosed herein is an example of a flow meter for measuring a flow of fluid that includes a housing, an obstacle suspended in the flow of fluid that is selectively changeable between configurations that occupy different percentages of a cross sectional area of the flow of fluid, and a pressure sensor in communication with the flow of fluid and that is selectively monitors pressure in the flow of fluid. The pressure sensor can be made up of an upstream pressure sensor that is disposed upstream of the obstacle; here the flow meter includes a downstream pressure sensor that is disposed downstream of the obstacle. Further in this example, the upstream pressure sensor can include an upstream pressure tap formed through a sidewall of a tubular in which the flow of fluid is directed, and wherein the downstream pressure sensor includes a downstream pressure tap formed through the sidewall of the tubular. The flow meter can further include a differential pressure sensor that is in communication with the upstream and downstream pressure sensors. In an example, the obstacle has an upstream end that is conically shaped and that has an outer surface that converges to a point, wherein a downstream end of the obstacle is conically shaped and has an outer surface that converges to a downstream point that is oriented in a direction away from the upstream point, and wherein the upstream and downstream ends are directly adjacent one another to define a ridge that circumscribes a mid-portion of the obstacle. The flow meter can include struts mounted to the upstream and downstream ends of the obstacle and that suspend the obstacle in the flow of fluid. In an embodiment, the obstacle has a downstream end with a shape that can include a planar surface or a hemispherical surface. A support may be included that mounts to the obstacle and which can selectively exert a radial force onto the obstacle for changing configurations of the obstacle. The obstacle can include a flexible frame. Optionally included is a cover over the frame that is substantially fluid impermeable. The support can be an upper support that includes a connecting rod that couples to the obstacle and a stud that extends from the connecting rod through a sidewall of the housing. The flow meter can further include a lower support that includes a connecting rod coupled to the obstacle and a stud that extends from the connecting rod through a sidewall of the housing. In one example, the flow meter includes spring coupled between the upstream end of the obstacle and a strut.

Also described herein is an example of a flow meter for measuring a flow of fluid and which includes a tubular housing intersected by the flow of fluid, and that is set inline in a flow line that handles the flow of fluid, an obstacle suspended in the tubular housing and in the path of the flow of fluid that is selectively changeable into multiple configurations that have varying diameters, and pressure taps formed through a sidewall of the tubular housing that are in communication with the flow of fluid. A differential pressure sensor can optionally be included that is in communication with the pressure taps. Changing the obstacle into different configurations changes a cross sectional percentage that the obstacle occupies in the flow of fluid. A support can be included that connects to the obstacle for selectively changing the obstacle into different configurations. In one example, the support includes a connecting rod having an end coupled with the obstacle, a stud having an end connected to an end of the connecting rod distal from the obstacle, and wherein an end of the stud projects radially through a sidewall of the tubular housing. The obstacle configuration can be changed manually or automatically. In one example of manually changing the configuration, threaded adjustment members couple to the obstacle, so that rotating the adjustment member alters obstacle diameter. An example of automatic changing includes sensing differential pressure across the obstacle, and making adjustments based on the sensed pressure.

An example of a method of measuring a flow of fluid is described herein and which includes monitoring a flow of fluid across a conically shaped obstacle, changing a configuration of the obstacle to change a percentage of the cross sectional area of the flow of fluid occupied by the obstacle, and sensing a pressure in the flow of fluid proximate the obstacle. The step of changing a configuration of the obstacle can be based on a value of pressure sensed in the flow of fluid.

BRIEF DESCRIPTION OF DRAWINGS

Some of the features and benefits of the present invention having been stated, others will become apparent as the description proceeds when taken in conjunction with the accompanying drawings, in which:

FIG. 3 is a schematic representation of a process circuit having flow meters that can be one or more of the types of FIGS. 1 and 2.

Figure 1:
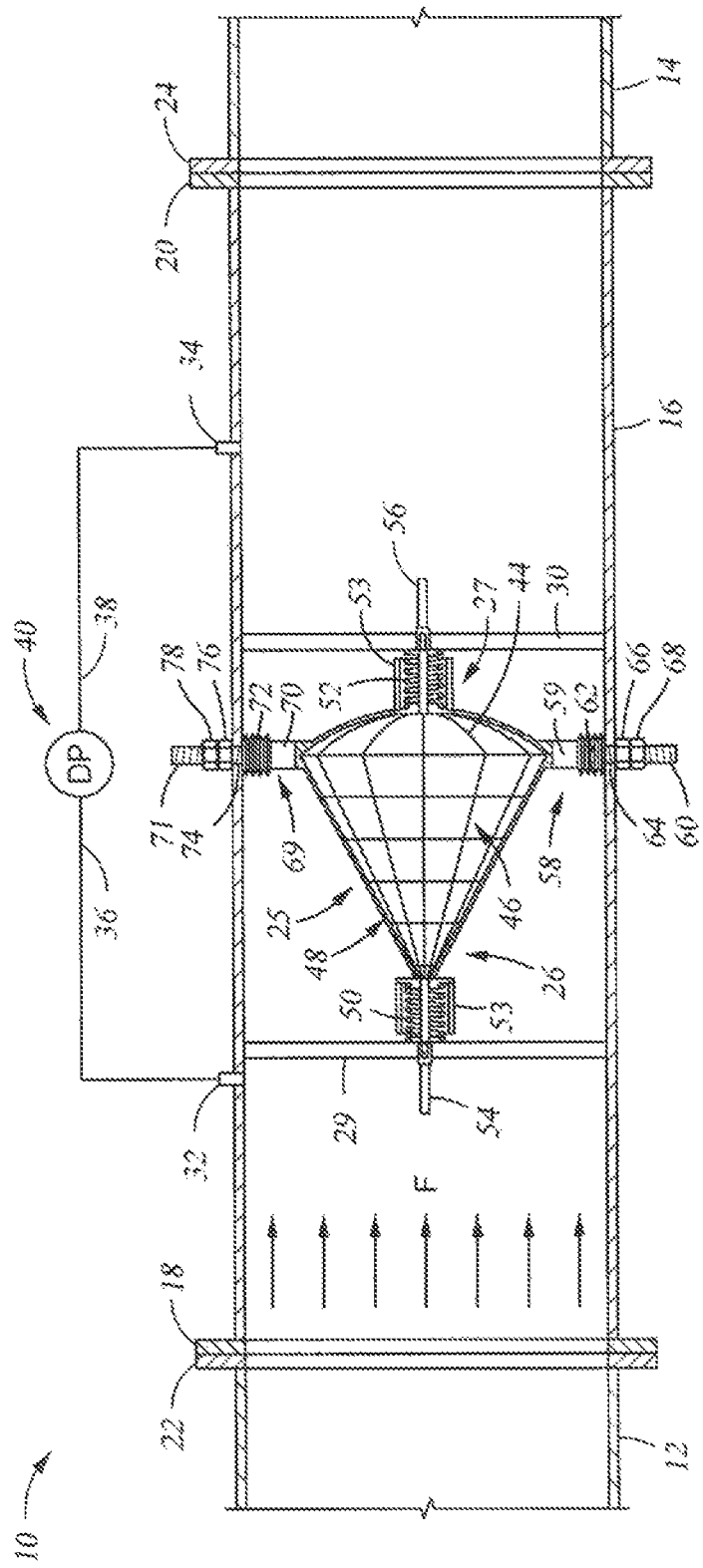
FIG. 1 is a side partial sectional view of an example of a flow meter having a flow element of varying configurations.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/− 5% of the cited magnitude. In an embodiment, usage of the term "substantially" includes +/− 5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

FIG. 1 shows in a side partial sectional view an example of a flow meter 10 that is set between upstream and downstream portions 12, 14 of a fluid flow line. Flow meter 10 includes an annular housing 16 with an upstream flange 18 on its upstream end and downstream flange 20 on its downstream end. Upstream and downstream flanges 18, 20 respectively connect to flanges 22, 24 on the upstream and downstream portions 12, 14. Shown suspended within housing 16 is a flow element 25 with upstream and downstream ends 26, 27. In the illustrated example, upstream end 26 has a generally conical in shape, and converges to a point distal from downstream end 27 and directed into a flow of fluid F. Downstream end 27 has a generally domelike shape with an apex that is substantially coaxial with upstream end 26 and on a side of downstream end 27 distal from upstream end 26. The base portion of each of the upstream and downstream ends 26, 27 meet at a middle portion of the flow element 25. Struts 29, 30 are shown mounted in the inner surface of the housing 16 and respectively couple with the upstream and downstream ends 26, 27 to provide anchoring supports for the flow element 25.

An upstream pressure tap 32 is shown formed through a sidewall of the housing 16 and upstream of strut 29. A downstream tap 34 extends through a sidewall of housing 16 and downstream of strut 30. Embodiments exist wherein the taps 32, 34 are adjacent to struts 29, 30, or on the opposite side thereof. Lengths of tubing 36, 38 have ends that connect respectively to the upstream and downstream pressure taps 32, 34. On ends opposite to their connection to the taps 32, 34, the lengths of tubing 36, 38 communicate with a differential pressure sensor 40. Thus, when the flow of fluid F makes its way through the upstream portion 12 and into the flow meter 10, the cross-sectional area of the flow of fluid F is reduced by the presence of the flow element 25, thereby introducing a pressure drop within flow meter 16. By sensing pressures of the flow of fluid F at the pressure taps 32, 34, and comparing the sensed pressures with the differential pressure sensor 40, a pressure drop due to the presence of the flow element 25 can be measured. Further, applying Bernoulli's theorem to the measured pressure drop along with physical parameters of the flow element 25 and the fluid F, a value for a fluid flow rate can then be calculated.

The flow element 25 of FIG. 1 is selectively changeable into different configurations; winch in turn can selectively change the diameter of the flow element 25 to one or more designated values. Embodiments exist where the changing configurations also changes the percentage of the cross-sectional area of the flow of fluid F that is occupied by the flow element 25. In this example, the flow element 25 includes a frame 44 made of elongate structural elements that form the general outline of the flow element 25. Arranged over the frame 44 is a rib array 46, where rib array 46 is a collection of elongate elements, which in one example is greater than the number of elongate elements making up frame 44. The application of the rib array 46 over frame 44 helps to give the outer surface of the flow element 25 a more uniform and continuous shape and to resemble a solid member. Over the rib array 46 and frame 44 is a membrane like cover 48 that is formed from a material that is generally impermeable by fluid. In an embodiment, cover 48 is pliable and generally conforms to the outer surface of the rib array 46 and frame 44. Sample materials for cover 48 include polymers, elastomers, composites, metals, and combinations thereof.

Further included in the embodiment of the flow meter 10 of FIG. 1 are springs 50, 52 which mount respectfully on the upstream and downstream ends 26, 27 of flow element 25. On ends opposite to their connection to flow element 25, springs 50, 52 couple with the struts 29, 30 to thereby exert a stabilizing force on the flow element 25. Further illustrated is that the cover 48 couples to spring 52 on the downstream end of flow element 25. Sleeves 53 are provided over each of springs 50, 52 that provide a protective covering and shield the springs 50, 52 from debris. Optional push rods 54, 56 are shown on the upstream and downstream ends 26, 27 that insert into the struts 29, 30 and which provide support of the flow element 25 within housing 16 as well as radially centering flow element 25 within the housing 16.

Still referring to FIG. 1, a lower support 58 is shown that contributes to radially propping the flow element 25 within housing 16. Lower support 58 includes a lower connecting rod 59 shown attached to flow element 25, and could be connected to the frame 44, rib array 46, or both. A stud 60 that is at least partially threaded on its outer surface has an end connected to an end of lower connecting rod 59 distal from flow element 25. A bellows 62 is included within lower support 58 which is axially resilient, and circumscribes a portion of stud 60 within housing 16. Stud 60 projects through a bore 64 formed in a sidewall of housing 16. Nuts 66, 68 coaxially thread onto the lower end of the stud 60 for securing the lower support 58 to housing 16. Bellows 62 can optionally be welded to the lower connecting rod 59 and to the inner surface of housing 16. A seal (not shown) lines bore 64 to prevent fluid leakage across the lower support 58 and to the outside of housing 16. An upper support 69 provides attachment of the flow element 25 to housing 16, and includes an upper connecting rod 70 shown connected to frame 44 of flow element 25 on an end that is distal from where flow element 25 attaches to lower support 58. Connecting rod 70 can be connected to the flow element 25 in the same manner lower connecting rod 59 connects to flow element 25. A stud 71 has an end that attaches to an end of upper connecting rod 70 distal from flow element 25. A bellows 72 circumscribes a portion of stud 71 disposed within housing 16, and opposing ends of the bellows 72 can be welded to the upper connecting rod 70 and inner surface of housing 16. An end of stud 71 projects through a bore 74 formed radially in the housing 16. Portions of the outer surface of stud 71 are threaded. Nuts 76, 78 threadingly mount onto the end of stud 71 outside of housing 16. A seal (not shown) provides sealing around bore 74 to prevent fluid from leaking therethrough. It should be pointed out that bores 64, 74 can be on opposite sides of the housing 16 (i.e. 180° apart around the axis of the housing 16), or angularly spaced apart at less than 180° from one another. Further, the bores 64, 74 can be at the same or different axial locations along the housing 16.

In one example of operation, selectively loosening or tightening nuts 76, 78 radially displaces the actuation rod 70 with respect to the sidewall housing 16; which in turn pulls or pushes against the rib array 46 and frame 44 and changes their respective diameters. As the diameters of the rib array 46 and frame 44 change, so do the diameters of the cover 48 and flow element 25. As the bellows 62, 72 connect between the connecting rods 59, 70 and inner surface of housing 16, the bellows 62, 72 will expand or compress with changing diameter of the flow element 25. Providing sealing interfaces between the bellows 62, 72 and connecting rods 59, 70, and bellows 62, 72 and housing 16 forms a flow barrier between the inside of the housing 16 and bores 64, 74. Altering the configuration of flow element 25 modifies the cross-sectional area occupied by the flow element 25 in the overall flow of fluid F. As such, reconfiguring the flow element 25 can selectively affect a pressure reading(s) taken by the differential pressure sensor 40. In this example, springs 50, 52 may elongate to allow for the radial expansion of the flow element 25. Changing the physical dimensions of the flow element 25 during use allows flow meter 10 to readily adapt to changes in the fluid flow, such as variations in the fluid flow rate due to different process scenarios or upset conditions. In one embodiment, a flow rate of the fluid F is based on a pressure sensed in the flow meter 10. The pressure sensed can be pressure at taps 32, 34, or a difference between the pressure at taps 32, 34, such as that measured by differential pressure sensor 40.

One or more forms of the Bernoulli equation can be used to estimate a flow rate of the fluid F based on the sensed pressure(s). It is within the capabilities of one skilled in the art to correlate the sensed pressures to a rate of the flow of fluid F. Moreover, factors relating to the changing shape and/or configuration of the flow element can be determined without undue experimentation. In one alternate embodiment, the configuration of the flow element 25 can be changed in response to pressure sensed upstream of the flow element 25, downstream of the flow element 25, across the flow element 25, or combinations thereof. A controller (not shown) can be included that is in communication with the pressure taps and automatically alters the configuration of the flow element 25 based on comparing a sensed pressure with a designated pressure.

Figure 2:
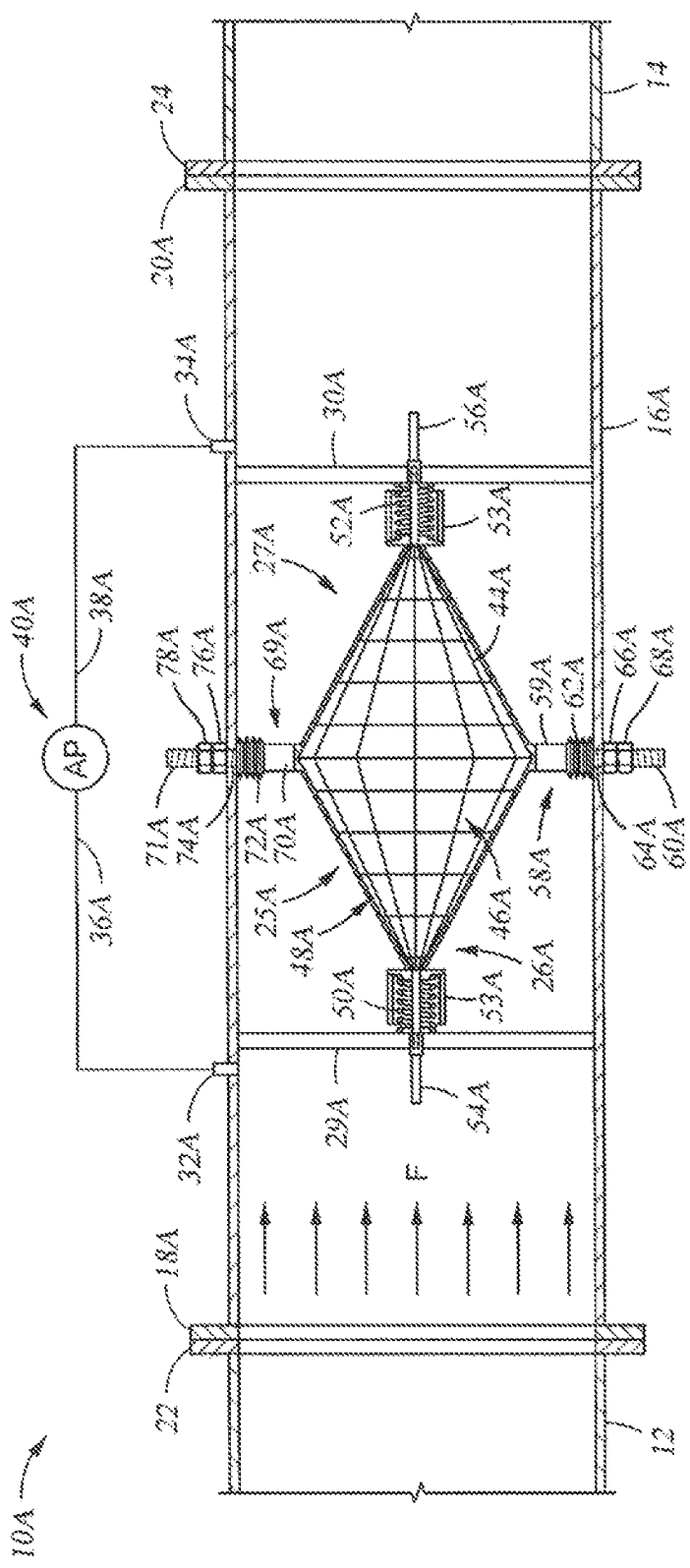
FIG. 2 is a side partial sectional view of an alternate embodiment of a flow meter having a flow element of varying configurations.

Shown in FIG. 2 is another example of a flow meter 10A, which has a flow element 25A, like the flow element 25 of FIG. 1, has an outer diameter that can be selectively changed via manipulation of an actuation rod 70A. Unlike the flow element 25A of FIG. 1, however, flow element 25A has a downstream end 27A that has a generally conical shape and whose outer surface converges to a point proximate its coupling with spring 52A and adjacent strut 30A. Similarly, the flow element 25A includes a frame 46A with elongate elements that give the general shape of the double-ended cone, and an overlay of the rib array 46A which provides a better approximation of a continuous outer surface of the flow element 25A. Also included in the example of FIG. 2, is a cover 48A which spans the outer surface of frame 44A and rib array 46A, and made from a material that is generally impermeable to fluid, thereby giving characteristics of the flow element 25A to be that of a substantially solid element. Also, similar to the embodiment of FIG. 1 is that the :flow meter 10A of FIG. 2. includes upper and lower supports 69A, 58A that respectfully include connecting rods 70A, 59A, bellows 72A, 62A, and studs 71A, 60A. The percentage of the cross sectional area of the flow of fluid F occupied by the flow elements 25, 25A is $(D_{FE}^2/D_F^2)*100$, where $D_{FE}$ is diameter of the flow elements, and $D_F$ is the diameter of the flow of fluid F.

FIG. 3 is a schematic representation of an example of a process circuit 80 in which the flow elements described herein may be employed. In the example, a column 82 is shown having a bottoms line 84 which corrects fluid within column 82 to a pump 86 for pressurization. Downstream of pump 86 is one example of an application of a flow meter 88 and where flow meter 88 is positioned just upstream of a control valve 90. In this example, flow information is forwarded from the flow meter 88 to the control valve 90. A reflux line 92 routes fluid exiting control valve 90 back into column 82. A gravity line 94 is shown branching from bottoms line 84 and upstream of pump 86 which delivers fluid in bottoms line 84 to a destination vessel 96. A flow meter 98, which can be any of the other flow meters described herein, is shown provided in gravity line 94. As such, flow meters 88, 98 can provide information about the flow of fluid flowing within lines 92, 94 respectively.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. for example, the fluid being monitored by the flow meters described herein can be liquid, vapor, or multiphase flow. Additionally, pressures at each of the pressure taps 32, 32A, 34, 34A can be monitored and recorded in addition to monitoring a pressure differential between axially spaced apart taps. These and other similar modifications will readily suggest themselves to those skilled in the art, and are intended to be encompassed within the spirit of the present invention disclosed herein and the scope of the appended claims.

What is claimed is:

1. A flow meter for measuring a flow of fluid comprising:
   a housing;
   an obstacle suspended in the flow of fluid that is selectively changeable between configurations that occupy different percentages of a cross sectional area of the flow of fluid; and
   a pressure sensor in communication with the flow of fluid and that selectively monitors pressure in the flow of fluid.

2. The flow meter of claim 1, wherein the pressure sensor comprises an upstream pressure sensor that is disposed upstream of the obstacle, the flow meter further comprising a downstream pressure sensor that is disposed downstream of the obstacle.

3. The flow meter of claim 2, wherein the upstream pressure sensor comprises an upstream pressure tap formed through a sidewall of a tubular in which the flow of fluid is directed, and wherein the downstream pressure sensor comprises a downstream pressure tap formed through the sidewall of the tubular.

4. The flow meter of claim 2, further comprising a differential pressure sensor that is in communication with the upstream and downstream pressure sensors.

5. The flow meter of claim 1, wherein the obstacle comprises an upstream end that is conically shaped and that has an outer surface that converges to a point wherein a downstream end of the obstacle is conically shaped and has an outer surface that converges to a downstream point that is oriented in a direction away from the upstream point, and wherein the upstream and downstream ends are directly adjacent one another to define a ridge that circumscribes a mid-portion of the obstacle.

6. The flow meter of claim 5, further comprising struts mounted to the upstream and downstream ends of the obstacle and that suspend the obstacle in the flow of fluid.

7. The flow meter of claim 1, wherein the obstacle has a downstream end with a shape selected from the group consisting of a planar surface and a hemispherical surface.

8. The flow meter of claim 1, further comprising a support that mounts to the obstacle and which can selectively exert a radial force onto the obstacle for changing configurations of the obstacle.

9. The flow meter of claim 8, wherein the obstacle comprises a flexible frame.

10. The flow meter of claim 9, further comprising a cover over the frame that is substantially fluid impermeable.

11. The flow meter of claim 8, wherein the support comprises an upper support that includes a connecting rod that couples to the obstacle and a stud that extends from the connecting rod through a sidewall of the housing.

12. The flow meter of claim 11, further comprising a lower support that includes a connecting rod that couples to the obstacle and a stud that extends from the connecting rod through a sidewall of the housing.

13. The flow meter of claim 8, further comprising a spring coupled between the upstream end of the obstacle and a strut.

14. A flow meter for measuring a flow of fluid comprising:
a tubular housing intersected by the flow of fluid, and that is set inline in a flow of fluid that handles the flow of fluid;
an obstacle suspended in the tubular housing and in the path of the flow of fluid that is selectively changeable into multiple configurations that have varying diameters; and
pressure taps formed through a sidewall of the tubular housing that are in communication with the flow of fluid.

15. The flow meter of claim 14, further comprising a differential pressure sensor that is in communication with the pressure taps.

16. The flow meter of claim 14, wherein changing the obstacle into different configurations changes a cross sectional percentage that the obstacle occupies in the flow of fluid.

17. The flow meter of claim 16, further comprising an support that connects to the obstacle for selectively changing the obstacle into different configurations.

18. The flow meter of claim 17, wherein the support comprises a connecting rod having an end coupled with the obstacle, a stud having an end connected to an end of the connecting rod distal from the obstacle, and wherein an end of the stud projects radially through a sidewall of the tubular housing.

19. A method of measuring a flow of fluid comprising:
monitoring a flow of fluid across a conically shaped obstacle;
changing a configuration of the obstacle to change a percentage of the cross sectional area of the flow of fluid occupied by the obstacle; and
sensing a pressure in the flow of fluid proximate the obstacle.

20. The method of claim 19, wherein the step of changing a configuration of the obstacle is based on a value of pressure sensed in the flow of fluid.

* * * * *